(12) United States Patent
Yan et al.

(10) Patent No.: US 10,127,156 B1
(45) Date of Patent: Nov. 13, 2018

(54) CACHING TECHNIQUES

(71) Applicant: EMC IP Holding Company LLC, Hopkinton, MA (US)

(72) Inventors: Biao Yan, Chengdu (CN); Bo Hu, Chengdu (CN); Jia Huang, Chengdu (CN); Jing Ye, Chengdu (CN); Qian Wu, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/279,717

(22) Filed: Sep. 29, 2016

(51) Int. Cl.
*G06F 12/08* (2016.01)
*G06F 3/06* (2006.01)
(Continued)

(52) U.S. Cl.
CPC ........ *G06F 12/0868* (2013.01); *G06F 3/0604* (2013.01); *G06F 3/0644* (2013.01); *G06F 3/0647* (2013.01); *G06F 3/0665* (2013.01); *G06F 3/0685* (2013.01); *G06F 12/0804* (2013.01); *G06F 12/0873* (2013.01); *G06F 12/0897* (2013.01); *G06F 2212/152* (2013.01); *G06F 2212/154* (2013.01);
(Continued)

(58) Field of Classification Search
CPC ............ G06F 12/0868; G06F 12/0804; G06F 12/0873; G06F 12/0897; G06F 3/0604; G06F 3/0644; G06F 3/0647; G06F 3/0665; G06F 3/0685; G06F 2212/152; G06F 2212/154; G06F 2212/222; G06F 2212/225; G06F 2212/263; G06F 2212/284; G06F 2212/305
See application file for complete search history.

(56) References Cited

U.S. PATENT DOCUMENTS 5,915,262 A * 6/1999 Bridgers ............. G06F 12/0802
711/118
2006/0143399 A1* 6/2006 Petev .................... G06F 12/123
711/136
(Continued)

OTHER PUBLICATIONS

EMC, "VNX Fast Cache", VNX5100, VNX5300, VNX5500, VNX5700, & VNX7500 a Detailed Review, White Paper, Dec. 2013, 25 pps.

*Primary Examiner* — Michael Krofcheck
*Assistant Examiner* — William E. Baughman
(74) *Attorney, Agent, or Firm* — Muirhead and Saturnelli, LLC

(57) ABSTRACT

Techniques provide for specifying priorities and thresholds used for cache promotion and flushing on a per pool basis. The thresholds may include a promotion threshold and a flushing threshold. The promotion threshold is used to determine whether data portions of the pool are promoted to a secondary cache. The flushing threshold is used to determine whether any data portions of the pool currently stored in the secondary cache are flushed to non-volatile physical storage. Each of the promotion threshold and the flushing threshold for the pool may be determined in accordance with the priority specified for the pool. For remaining data portions that are included in a pool for which a pool specific priority is not specified, a default technique may be used, for example, which uses the same promotion threshold and the same flushing threshold for all pools for which a pool specific priority is not specified.

22 Claims, 11 Drawing Sheets

(51) Int. Cl.
*G06F 12/0868* (2016.01)
*G06F 12/0804* (2016.01)
*G06F 12/0873* (2016.01)
*G06F 12/0897* (2016.01)

(52) U.S. Cl.
CPC .. *G06F 2212/222* (2013.01); *G06F 2212/224* (2013.01); *G06F 2212/225* (2013.01); *G06F 2212/263* (2013.01); *G06F 2212/284* (2013.01); *G06F 2212/305* (2013.01)

(56) References Cited

U.S. PATENT DOCUMENTS

| | | | | |
|---|---|---|---|---|
| 2009/0328047 | A1* | 12/2009 | Li | G06F 9/5033 718/102 |
| 2011/0191522 | A1* | 8/2011 | Condict | G06F 12/123 711/103 |
| 2015/0095696 | A1* | 4/2015 | Hess | G06F 11/108 714/6.24 |
| 2015/0277773 | A1* | 10/2015 | Shen | G06F 3/0607 711/114 |
| 2016/0162422 | A1* | 6/2016 | Weber | G06F 13/28 710/308 |
| 2016/0321176 | A1* | 11/2016 | Yoo | G06F 12/0811 |

\* cited by examiner

| 8 bits $T_{promotion}$ 702 | 56 bits Pool ID 704 | |
|---|---|---|
| 8 bits $T_{flushing}$ 706 | 16 bits Pool Priority 708 | 40 bits Reserved |

CACHING TECHNIQUES

BACKGROUND

Technical Field

This application generally relates to caching.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of techniques herein is a method of caching data comprising: performing promotion processing to promote one or more data portions to a secondary cache, wherein said secondary cache and a primary data cache are included in a plurality of caching layers, said promotion processing using a first promotion threshold specified for the first pool to determine whether a first data portion of the first pool is promoted to the secondary cache, said promotion processing using a second promotion threshold specified for the second pool to determine whether a second data portion of the second pool is promoted to the secondary cache; and performing flushing processing to flush one or more data portions from the secondary cache to physical storage, said flushing processing using a first flushing threshold specified for the first pool to determine whether a third data portion of the first pool is flushed from the secondary cache, said promotion processing using a second flushing threshold specified for the second pool to determine whether a fourth data portion of the second pool is flushed from the secondary cache. The promotion processing may include determining whether a first count, denoting a number of I/Os referencing the first data portion, is equal to or greater than the first promotion threshold; and responsive to determining the first count is equal to or greater than the first promotion threshold, promoting the first data portion to the secondary cache. The promotion processing may include determining whether a second count, denoting a number of I/Os referencing the second data portion, is equal to or greater than the second promotion threshold; and responsive to determining the second count is equal to or greater than the second promotion threshold, promoting the second data portion to the secondary cache. The third data portion may be stored at a first logical address of a first logical device included in the first pool, and the flushing processing may include determining whether a third count, denoting a number of cache pages of the secondary cache include cached data of the first logical device, exceeds the first flushing threshold; and responsive to determining the third count exceeds the first flushing threshold, flushing the third data portion from the secondary cache to physical storage. Data portions of the first logical device may be flushed from the secondary cache to physical storage until the third count is below the first flushing threshold. The fourth data portion may be stored at a second logical address of a second logical device included in the second pool, and the flushing processing may include determining whether a fourth count, denoting a number of cache pages of the secondary cache include cached data of the second logical device, exceeds the second flushing threshold; and responsive to determining the fourth count exceeds the second flushing threshold, flushing the fourth data portion from the secondary cache to physical storage. Data portions of the second logical device may be flushed from the secondary cache to physical storage until the fourth count is below the second flushing threshold. The method may also include receiving a first set of values are specified for the first pool, said first set of values including a first priority for the first pool, the first flushing threshold for the first pool and the first promotion threshold for the first pool; and receiving a second set of values for the second pool, said second set of values including a second priority for the second pool, the second flushing threshold for the second pool and the second promotion threshold for the second pool. The first flushing threshold and the first promotion threshold may be calculated using the first priority. The second flushing threshold and the second promotion threshold may be calculated using the second priority. The flushing processing may be performed responsive to determining that a current number of free pages in the secondary cache is below a specified minimum threshold. The secondary cache may include a plurality of flash-based storage devices. The first pool may include a first plurality of logical devices and the second pool may include a second plurality of logical devices, wherein the first set of values may be used in connection with performing promotion and flushing of the secondary cache with respect to data portions of the first plurality of logical devices, and wherein the second set of values may be used in connection with performing promotion and flushing of the secondary cache with respect to data portions of the second plurality of logical devices. The plurality of caching layers may be included in a data storage system.

In accordance with another aspect of techniques herein is a system comprising: one or more processors; and a memory comprising code stored therein that, when executed by at least one of the processors, performs a method of caching data comprising: performing promotion processing to promote one or more data portions to a secondary cache, wherein said secondary cache and a primary data cache are included in a plurality of caching layers, said promotion processing using a first promotion threshold specified for the first pool to determine whether a first data portion of the first pool is promoted to the secondary cache, said promotion processing using a second promotion threshold specified for the second pool to determine whether a second data portion of the second pool is promoted to the secondary cache; and performing flushing processing to flush one or more data portions from the secondary cache to physical storage, said flushing processing using a first flushing threshold specified for the first pool to determine whether a third data portion of the first pool is flushed from the secondary cache, said promotion processing using a second flushing threshold specified for the second pool to determine whether a fourth data portion of the second pool is flushed from the secondary cache.

In accordance with yet another aspect of techniques herein is a computer readable medium comprising code stored thereon that, when executed, performs a method of caching data comprising: performing promotion processing to promote one or more data portions to a secondary cache, wherein said secondary cache and a primary data cache are included in a plurality of caching layers, said promotion processing using a first promotion threshold specified for the first pool to determine whether a first data portion of the first pool is promoted to the secondary cache, said promotion processing using a second promotion threshold specified for the second pool to determine whether a second data portion of the second pool is promoted to the secondary cache; and performing flushing processing to flush one or more data portions from the secondary cache to physical storage, said flushing processing using a first flushing threshold specified for the first pool to determine whether a third data portion of the first pool is flushed from the secondary cache, said promotion processing using a second flushing threshold specified for the second pool to determine whether a fourth data portion of the second pool is flushed from the secondary cache. The promotion processing may include determining whether a first count, denoting a number of I/Os referencing the first data portion, is equal to or greater than the first promotion threshold; responsive to determining the first count is equal to or greater than the first promotion threshold, promoting the first data portion to the secondary cache; determining whether a second count, denoting a number of I/Os referencing the second data portion, is equal to or greater than the second promotion threshold; and responsive to determining the second count is equal to or greater than the second promotion threshold, promoting the second data portion to the secondary cache. The third data portion may be stored at a first logical address of a first logical device included in the first pool, and wherein the flushing processing may include determining whether a third count, denoting a number of cache pages of the secondary cache include cached data of the first logical device, exceeds the first flushing threshold; and responsive to determining the third count exceeds the first flushing threshold, flushing the third data portion from the secondary cache to physical storage. Data portions of the first logical device may be flushed from the secondary cache to physical storage until the third count is below the first flushing threshold. The fourth data portion may be stored at a second logical address of a second logical device included in the second pool, and wherein the flushing processing may include determining whether a fourth count, denoting a number of cache pages of the secondary cache include cached data of the second logical device, exceeds the second flushing threshold; and responsive to determining the fourth count exceeds the second flushing threshold, flushing the fourth data portion from the secondary cache to physical storage. Data portions of the second logical device may be flushed from the secondary cache to physical storage until the fourth count is below the second flushing threshold. A first set of values may be specified for the first pool, where the first set of values includes a first priority for the first pool, the first flushing threshold for the first pool and the first promotion threshold for the first pool. The first flushing threshold and the first promotion threshold may be determined in accordance with the first priority. A second set of values may be specified for the second pool, where the second set of values includes a second priority for the second pool, the second flushing threshold for the second pool and the second promotion threshold for the second pool. The second flushing threshold and the second promotion threshold may be determined in accordance with the second priority.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example of a data structure that may be stored in memory in an embodiment in accordance with techniques herein;

DETAILED DESCRIPTION OF EMBODIMENT(S)

Figure 1:
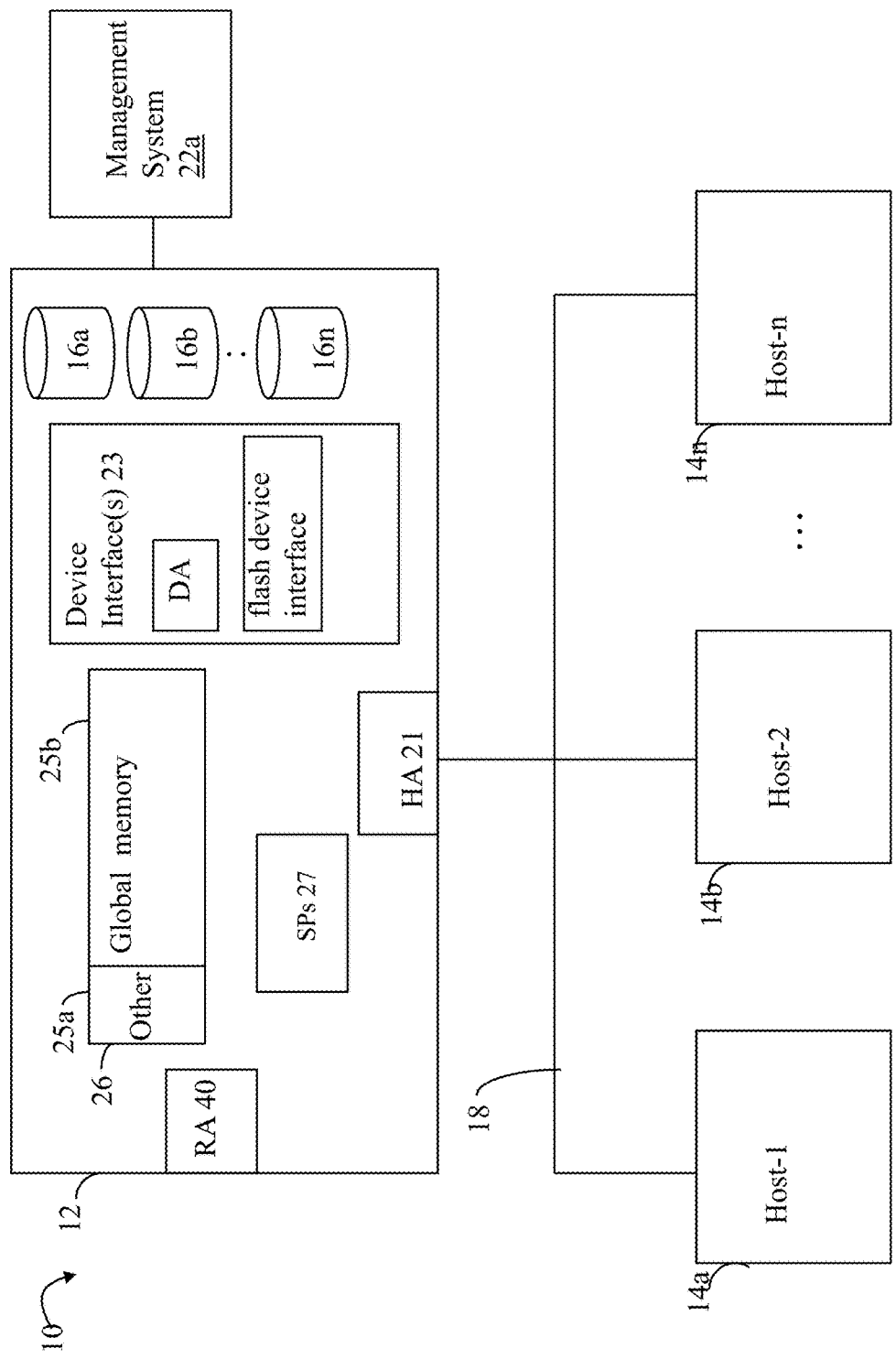
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14*a*-14*n* through communication medium 18. In this embodiment of the computer system 10, and the n hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n (e.g., non-volatile physical data storage devices or PDs used as backend physical storage of the system 12). The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache (also referred to as a data cache) that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

As known in the art, a LUN may have physical storage provisioned on one or more PDs of the data storage system where the LUN has a logical address space or range. Logical addresses of the LUN may be mapped to physical storage locations on the PDs. The logical address range for the LUN may, for example, range from a starting logical address of 0 to a maximum logical address that varies depending on the capacity of the particular LUN. In one embodiment, each logical address may denote a logical block address or offset from the starting LBA of 0. Each single block, such as LBA 0, may denote a block or generally some amount of storage that may vary with data storage system (e.g., block size may vary with data storage system).

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In connection with a data storage system such as described herein, an I/O request may be a read request to read data. The read request may be received at the data storage system at a port of a front-end component of the data storage system (such as one of the HAs as described elsewhere herein). In terms of processing a read request, a determination may be made as to whether all the requested read data is in cache (e.g., a cache hit). If so, the read request may be characterized as a read hit. In such cases of a read hit, the front-end component, such as the HA, receiving the read request may service the read request by retrieving all requested read data from the cache and returning the requested read data to the host. If all the requested read data is not in cache, the read may be characterized as a read miss (e.g., cache miss) whereby processing is performed to retrieve from physical storage any portion of the requested data that is not currently in cache. As described above, one or more DAs may perform processing to retrieve from physical storage any portion of the requested data not currently in cache. Once all the requested read data is in cache, the front-end component, such as the HA, receiving the read request may service the read request by retrieving all requested read data from the cache and returning the requested read data to the host. In this manner, a front-end component may service read requests using data that is already stored in cache prior to processing the read request, as well as using data that is brought into cache from physical storage responsive to receiving the read request.

Storing such data in cache is performed with the goal of servicing subsequent I/Os using cached data without having to retrieve the data from physical storage. In an embodiment in accordance with techniques herein, processing may be performed as just described to unconditionally cache reads as a result of a cache miss and to execute a dependent sequence of steps whereby the DA writes read miss data (retrieved from physical storage) to cache and the HA then retrieves the requested data from the cache to return to the requesting host.

In connection with write operations, write data received at the data storage system may be stored in cache and then written out later to physical storage, such as written to backend physical storage devices by a DA. Once the write data is written into cache, the data may be marked as write pending (WP) in cache denoting that the cached write data is the most recent copy of the data and needs to be destaged to backend physical storage devices. The cache location including the WP data may marked as dirty thereby indicating that the cache location includes valid data and contains the most recent copy of the data but has not yet been synchronized with the copy on physical storage of the back end. Once the write data is written to cache, the data storage system may send an acknowledgement to the host that the write operation has been completed even though the write data may not have yet been destaged from cache to the backend physical storage devices. Once the WP data has been destaged from cache to physical storage, the cache location including the write data may be characterized as clean where the cache location is valid and contains a copy of write data that has been synchronized with backend physical storage.

Figure 2:
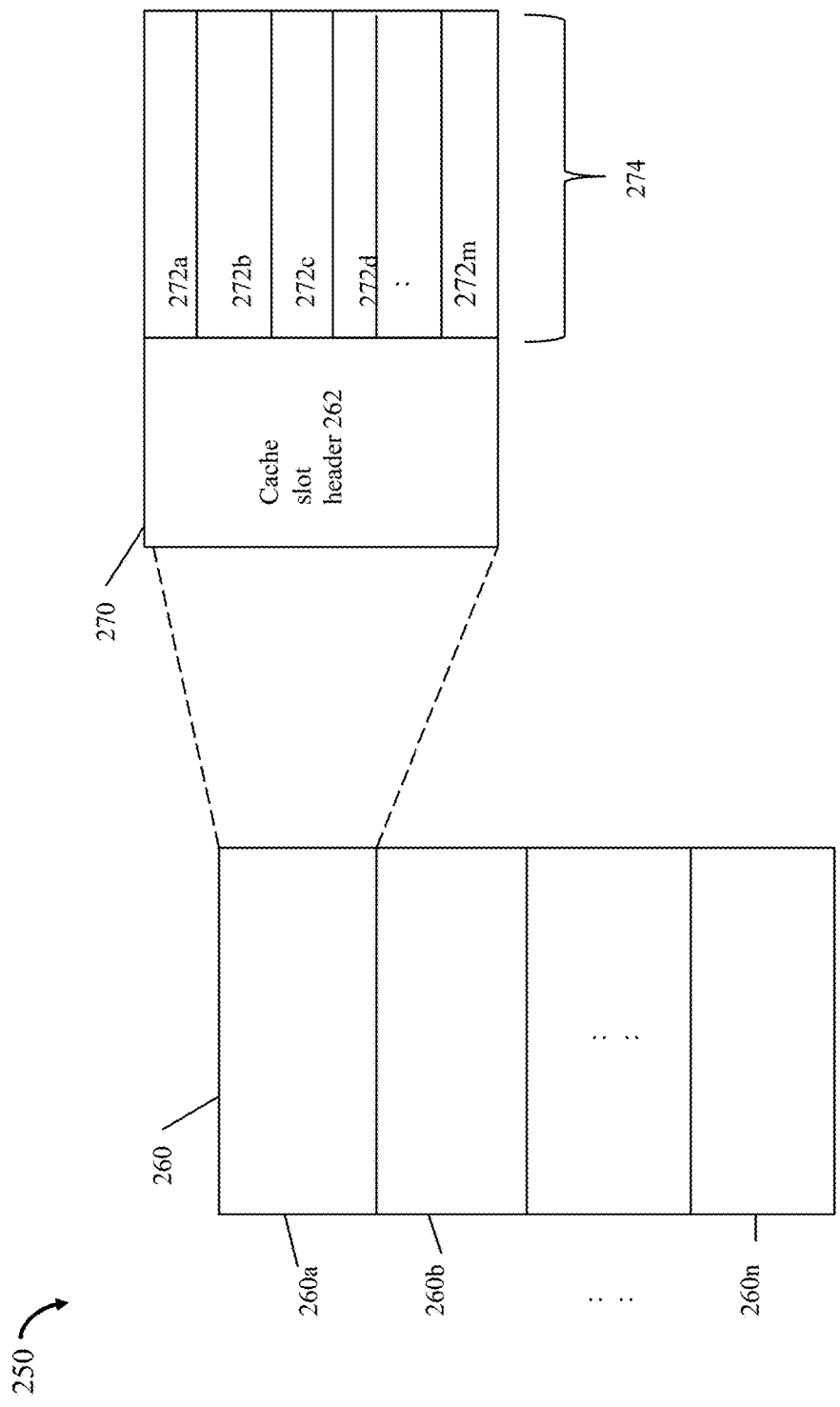
FIG. 2 is an example illustrating in more detail a representation of information that may be included in a primary data cache in an embodiment in accordance with techniques herein.

Referring to FIG. 2, shown is an example illustrating a logical representation of a cache that may be used in an embodiment in accordance with techniques herein. The cache in FIG. 2 may denote generally a data cache that may be used as part of a plurality of cache layers in an embodiment of a data storage system described in more detail below. The cache such as illustrated in FIG. 2 may be, for example, a DRAM cache that is primary or first caching layer in the plurality of caching layers described in more detail elsewhere herein.

In the example 250, element 260 may represent the memory or storage used as the cache which is partitioned into cache slots 260a-260n. It should be noted that the example 250 is a logical representation of a cache that may be implemented using any suitable data structure(s) known in the art. Each of the cache slots 260a-n may contain varying amounts of write pending data. Consistent with description elsewhere herein, write pending data may be user data received in connection with a write operation where the user data has been stored in cache and is waiting to be destaged or written out to physical storage (e.g., element 212 of FIG. 5A) from cache. Element 270 provides additional detail of single cache slot 260a. Cache slot 260a may include a cache slot header 262 and cache slot data 274. The cache slot data 274 illustrates that a single cache slot of data may further include multiple portions 272a-m each of which may or may not include write pending data and each of which may or may not include any cached data. The cache slot header 262 may include additional information regarding the cached data stored in 274. For example, the header 272 may denote whether the data cached in each of the portions 272a-m is write pending data.

It should be noted that the particular granularity or smallest unit of storage for storing cached data may vary with embodiment. For example, each of the portions 272a-m may denote a smallest unit of storage for storing cached data. Additionally, the particular number of portions in a cache slot may also vary with embodiment. In at least one embodiment described herein, a single block of data denoted by a single LBA of a LUN may be equal to the amount of data stored in a single cache page or entry.

Although not illustrated in FIG. 2 for simplicity and as known by those of ordinary skill in the art, an embodiment may store additional information for each of the cache slots regarding the data stored in area 274 of each such cache slot. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the cache 260 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD. In one embodiment, for example, the foregoing mapping of a LUN location so its physical device location may be included in the location information of MD associated with user data described in more detail elsewhere herein.

In the foregoing description above such as regarding read and write operation processing and in connection with FIG. 2, the data may be stored in the cache (e.g., data cache such as represented in FIG. 2) which may comprise a portion of global memory. Such use of a data cache and discussion above provides a general description of how caching may be used in a data storage system that includes a single level or L1 data cache. At least some data storage systems may use multiple levels of data caching such as discussed below.

Figure 3:
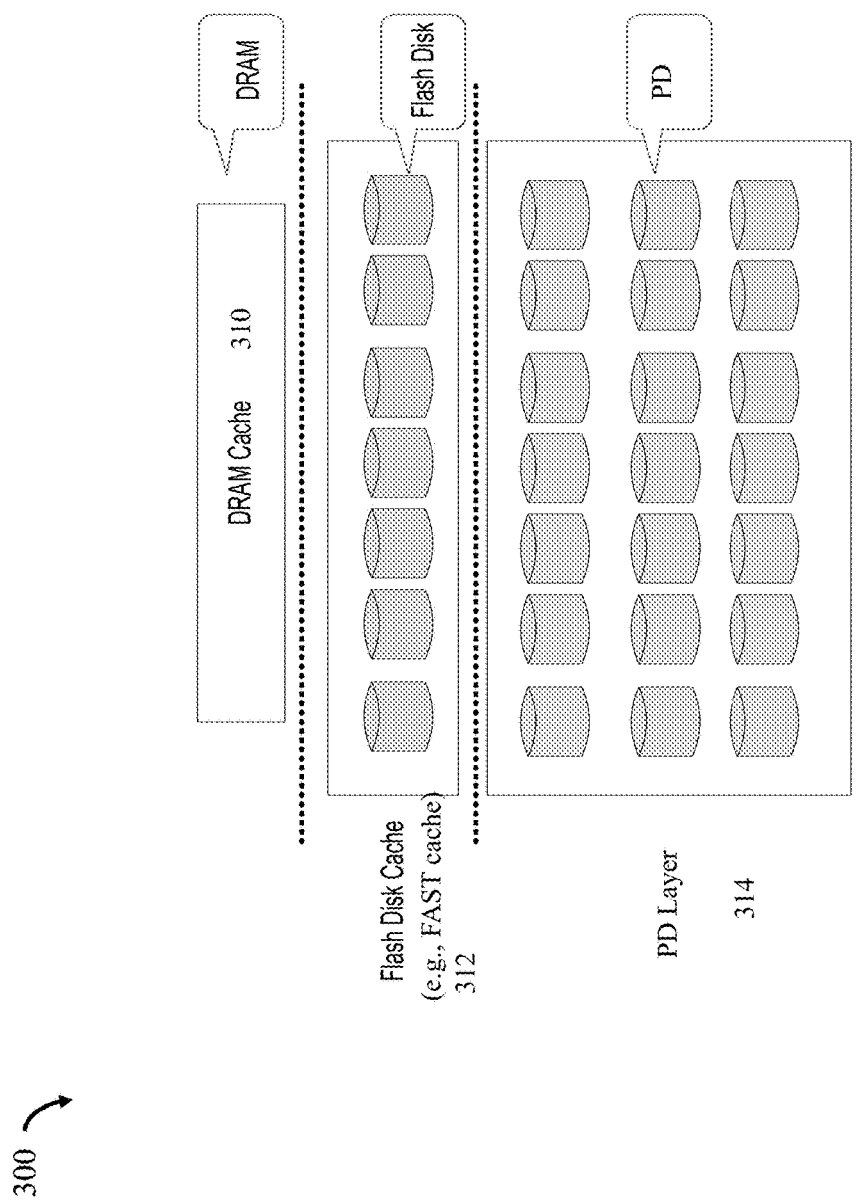
FIG. 3 is an example illustrating a plurality of layers that may be included in an I/O path in an embodiment in accordance with techniques herein.

Referring to FIG. 3, shown is an example illustrating a plurality of layers including caches and physical backend storage in an embodiment in accordance with techniques herein. The example 300 includes DRAM cache 310, flash disk cache 312, and a backend physical storage device (PD) layer 314. The flash disk cache 312 may include flash-based storage devices or other solid state storage. The PD layer 314 may include, for example, rotating disk drives that provide non-volatile storage for data and may be organized into groups such as RAID groups providing the backend PDs which may be accessed, for example, by DAs when reading data from the PDs (such as to read data from the PD and then store such read data in the DRAM cache 310 cache to service a read miss) and/or when writing data to the PDs (such as to destage data from DRAM cache 310). It should be noted that the PDs of 314 may also be referred to herein as backend PDs, backend non-volatile storage.

In at least one embodiment of a data storage system in the illustrated hierarchy of FIG. 3, the Flash Disk Cache 312 is under the DRAM or general data cache 310, and below the Flash Disk Cache 312 are backend PDs 314. Generally, the DRAM cache 310, also referred to herein as the cache or data cache, may be the primary or highest caching layer such as mentioned above where read and write data are placed on first instance in connection with an I/O operation. Thus, in one aspect, the DRAM cache 310 may denote a level 1 (L1) primary cache and the Flash disk cache 312 may denote a level 2 (L2) secondary cache. Element 310 may denote, for example, the cache to which data is first written when write operations are received by the host such as described above. Generally, the layers of FIG. 3 may be ranked, in terms of relative performance, from highest to lowest, as follows: DRAM cache 310, the flash disk cache 312, and PDs 314. The Flash disk cache 312 may include flash-based storage devices. More generally, the flash disk cache 312 may include a form of solid state or other storage that may be non-volatile or volatile which fits in with the above-mentioned relative performance ranking. In at least one embodiment of a data storage system such as the VNXe® data storage system by EMC Corporation, the flash disk cache 312 may be referred to as the VNXe® FAST Cache (or FAST Cache)

Flash disk cache 312 may be characterized as a storage-system component that improves performance by transparently storing or promoting data from PDs 314 into Flash Disk media (Flash disk) of layer 312, so that user requests for data can be served much faster than if retrieved from PDs 314. PDs of layer 314 may be used to store all the user data and serve the I/O requests which cannot be serviced by using data from either DRAM cache 310 or Flash disk cache 312. Generally, as mentioned above, PDs of layer 314 provide the slowest response time of all layers 310, 312 and 314 when there is a need to access the PD to read data therefrom and/or write data thereto.

Data may be promoted from PDs 314 to the flash cache 312 based on "temperature" related to I/O activity or frequency of access (e.g. number of reads and/or writes for the data). Placing or promoting data chunks from PDs 314 is not dependent on whether the data is already in DRAM cache 310. In at least one embodiment, the PDs 314 may denote rotating disk drives or more generally PDs having a lower performance than the flash-based drives of layer 312. In at least one embodiment, data may be stored in the Flash disk cache in chunks, such as chunks that are each 64 KB in size. It should be noted that in some systems, the backend physical storage devices may also include flash-based storage devices having an expected level of performance similar to those physical storage devices of the Flash disk cache 312. In such cases, an embodiment may decide not to use the Flash disk cache 312 with user data stored on back-end physical storage devices which are flash-based since there is similar performance when accessing data from either the back-end physical storage devices or Flash disk cache 312. Rather, an embodiment may selectively choose to enable or use the Flash disk cache 312 in connection with user data that will more generally see a performance benefit in obtaining data from the Flash disk cache rather than back-end storage devices. Thus, generally, the PDs of 314 may include rotational disk drives, or more generally, PDs having an excepted level of performance that is less than the expected level of performance when accessing data from drives or physical storage comprising the Flash disk cache 312.

In a manner similar to that as described in connection with FIG. 2, a memory map or mapping information may be maintained by the Flash disk cache layer 312 to indicate whether a particular data portion located at a particular LUN and offset (e.g., LBA) is currently stored in the Flash disk cache and if so, the particular location in the Flash disk cache where such data is located. In addition to the mapping information, the Flash disk cache 312 may also store information indicating whether the data stored in a cache page of the Flash disk cache 312 is dirty thereby denoting that the cache location includes valid data and contains the most recent copy of the data but has not yet been synchronized with the copy on of the PD layer 314. Generally, in addition to mapping information, the Flash disk cache layer 312 may use a structure referred to herein as the shadow cache to store other metadata that may be used by the Flash disk cache 312. For example, the shadow cache may store information regarding the access frequency of different data portions located at various LUN locations where such LUNs have storage provisioned from PDs of the PD layer 314. Thus, the frequency of access information in the shadow cache may be used to determine when to promote data from the PD layer 314 to the Flash disk cache 312.

It should also be noted that the Flash disk cache layer 312 may also experience cache or read hits and also cache or read misses with respect to whether requested read data is stored in the Flash disk cache 312. Thus, the Flash disk cache 312 may have associated states and experience cache hits and misses in a manner similar to the DRAM cache 310 used as the primary or level 1 cache in the hierarchy of FIG. 3.

Generally, the first time data is accessed for read or write, the data is stored in the DRAM cache 310 as the primary data cache in connection with I/O processing of the data path. Processing may be performed to monitor how frequently a particular data portion is accessed (such as within a specified period of time) to determine whether such observed access frequency reaches a threshold level to warrant storing such data also in the Flash disk cache layer 312. The shadow cache described above may be used by the Flash disk to track such access frequency for data at different LUN locations and determine when to promote a data portion stored at a particular LUN location from PDs 314 to the Flash disk cache 312.

In at least one embodiment the DRAM Cache 310 may cache the hottest (e.g., most frequently accessed) data and Flash Disk Cache 312 may cache data that is relatively less frequently accessed than data of the DRAM cache 310.

In connection with processing an I/O operation such as a read operation, processing may first determine whether the requested read data is in the primary data cache, such as the DRAM cache 310. If so, the requested data is read from cache and returned to the requester. If the requested read data is not in the primary data cache (e.g., DRAM cache 310), processing may determine whether the requested data is stored in the Flash disk cache. If so, the requested data is obtained from the Flash disk cache 312 and returned to the requester. If the requested data is not in the Flash disk cache 312, the requested data is obtained from PDs 314, may be stored in the DRAM cache 310 and then returned to the requester. Additionally, depending on frequency of access as described elsewhere herein, the data may also be stored in the Flash disk cache.

In connection with write operations, the write data is written to the primary data cache, such as the DRAM cache 310, and an acknowledgement is returned to the requester that the write operation has complete. At some later point in time, processing may be performed to destage the write data from the DRAM cache 310. As mentioned elsewhere herein, data, such as the write data being destaged, may be promoted to the Flash disk cache if there has been sufficient frequency of access to such write data. Thus, as part of destaging the write data from the DRAM cache 310, processing may include determining whether the write data has been promoted to the Flash disk cache. If so, the write data is stored in the Flash disk cache and then later may be flushed from the Flash disk cache to the PDs 314. If the write data is not promoted to the Flash disk cache, the data is written out from the DRAM cache directly to the PDs 314.

In some embodiments, it may be that write caching to the primary data cache, such as DRAM cache 310, is disabled whereby caching may be performed with respect to only the Flash disk cache layer 312. In such a case, the write data received is not stored in the DRAM cache 310 when received and rather the write operation data processing proceeds directly to the flash disk cache layer where a determination is made as to whether to store the data in the Flash disk cache. As noted elsewhere herein, such a determination may be made based on whether there has been a sufficient level of access frequency (e.g., above a specified threshold level of activity) to the write data to warrant storing or promoting the write data to the Flash disk cache. If it is determined that the write data has not been promoted to the Flash disk cache, the write data is written directly to the PDs 314. Otherwise, if it determined that the write data has been promoted to the Flash disk cache, the write data is written to the Flash disk cache and then some time later may be flushed to the PDs 314.

In an embodiment in accordance with techniques herein, the I/O path denoting the processing path taken in connection with processing a user or host I/O operation may pass through the layers such as illustrated in FIG. 3. Processing may be performed at the various layers as described herein to determine what steps are performed in connection with processing the I/O operation.

In at least one embodiment of a data storage system including multiple cores or processors, the cache engine used in connection with the L1 DRAM data cache, such as illustrated by 310 of FIG. 3, may also sometimes be referred to herein as a multi-core cache, or MCC, designed to take advantage of available cores in the system.

Consistent with discussion above, the DRAM cache 310 may be used in connection with all reads and writes, on hits or misses, and there is little additional overhead incurred for cached data used only once. In contrast, the flash disk cache or FAST cache 312 may route some of the I/Os destined for the PDs to flash storage of 312. To accomplish this, data may be moved between the PDs, such as rotating disk drives of layer 314, and the flash storage of 312. The foregoing movement involves significant overhead which should not be incurred unless there is a substantial likelihood of subsequent hits. Consistent with discussion above and in at least one embodiment in accordance with techniques herein, the shadow cache may include a promotion candidates list for the FAST cache 312, where the promotion candidates list may be used to store I/O hit block references and their hit counts. In other words, the promotion candidates list may record the count/number of received I/Os (e.g., I/O hits) that reference a particular block or LBA of a LUN (e.g., more generally logical device).

In at least one existing implementation of a data storage system without techniques herein, the following summarizes processing as may be performed for FAST cache promotion with respect to I/Os having data stored on PDs of layer 314:

A1) MCC or data cache layer 310 receives I/O directed to block X on a LUN A. LUN A, block X may be referred to as a target location or address with respect to the I/O.

A2) Processing determines that there is no cache entry in the MCC or data cache layer 310 for the target address. Additionally, data for the target address of the I/O is also not located in the FAST cache 312.

A3) The I/O reaches PD layer 314. In step c, the shadow cache information recorded for LUN A, block X has an associated reference hit count which is incremented by +1 for the hit by the current I/O A4) Subsequent I/Os that also reference or hit LUN A, block X (by having a target address of LUN A, block X whereby data is read from (e.g., read I/O), or written to (e.g., write I/O), the target address depending on the particular I/O) result in incrementing the reference hit count for LUN A, block X by +1 for each such I/O.

A5) Based on periodic scheduled times or other triggers causing FAST cache promotion processing, the shadow cache may be scanned to search for new data block candidates that may have become eligible for promotion to the FAST cache. In at least one embodiment, the promotion criterion for a data block to be promoted to FAST cache (312) may have an associated reference hit count that is greater than or equal to 3. Thus, 3 may be referred to as the promotion hit threshold count in this example. A data block meeting the foregoing promotion criterion may be promoted to FAST cache whereby the data block is stored in FAST cache. The memory map used by the FAST cache may be updated to now indicate that the data block corresponding to the logical address LUN A, block X is stored in a particular FAST cache location or entry. Additionally, information recorded in the shadow cache for LUN A, block X may be removed or discarded.

In order to ensure free pages available for new page promotion in the FAST Cache, a flush engine may be used to maintain free pages buffers and free dirty pages. In at least one existing implementation of a data storage system without techniques herein, the following summarizes processing as may be performed for FAST cache flushing with respect to LUNs having data stored on PDs of layer 314:

B1) Flush engine is idle when there are at least a specified number of free pages or entries in the FAST cache.

B2) When the number of free pages or entries available in the FAST cache is equal to or less than the specified number of pages, the flush engine processing may be triggered to attempt to flush data from the FAST cache to the PDs of 314. Such flushing may include scanning the FAST cache entries including cached data for a group (e.g. <=8) of LUNs. For each LUN, the total number of pages or entries currently allocated or in use containing data for the LUN may be determined. If the total number of pages or entries for the LUN is greater than a page threshold, the LUN may have its associated cached data flushed from the FAST cache on a page by page basis until the total number of pages of the FAST cache including the LUN's cached data is below the page threshold.

B3) Flush engine flushes cached data from FAST cache pages to the PDs until each of the LUNs of the current group have a total number of pages in the FAST cache below the page threshold.

B4) If the number of free pages in the FAST cache is still below the specified level (e.g., predefined water mark), the flush engine may continue scanning the FAST cache and performing flushing of existing cached data from a next group of LUNs by repeating processing of step B1-B3 with the next group of LUNs. Otherwise, if the number of free pages in the FAST cache is at or above the specified level, flushing may stop.

In connection with flushing, the same page threshold may be used for each LUN whereby if the current number of FAST cache pages allocated for storing the LUN's data exceeds the page threshold, flushing may be performed to reduce the current number of FAST cache pages allocated for the LUN's data to be below the page threshold.

Figure 4:
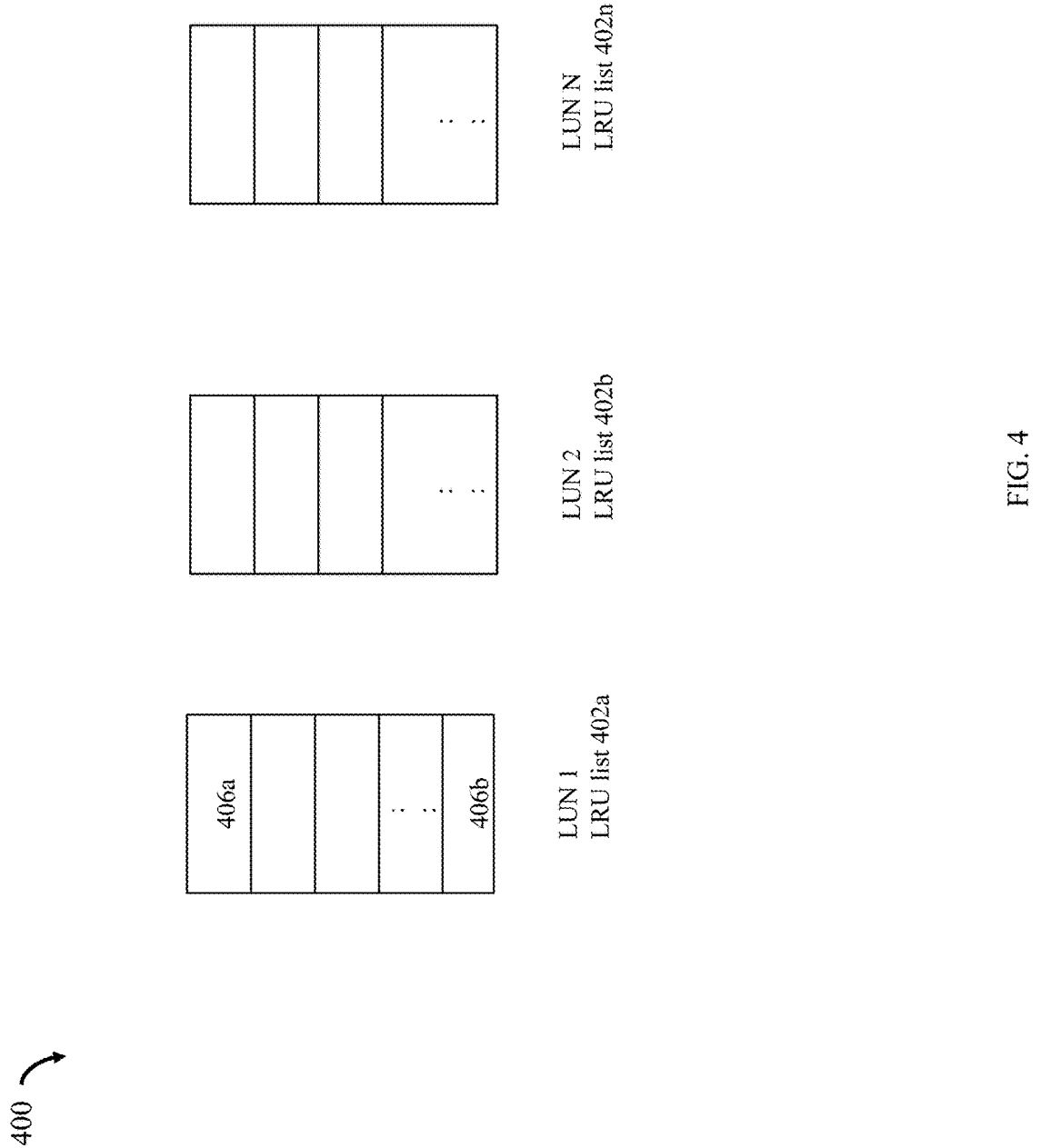
FIG. 4 is an example illustrating list of cached data blocks or pages for LUNs in an embodiment in accordance with techniques herein.

With reference to FIG. 4, the Flash disk cache or FAST cache may partition its cached pages of data on a per-LUN basis whereby each LUN's cached pages may be grouped together logically in connection with a data structure such as illustrated in the example 400 of FIG. 4. For example, FIG. 4 includes lists 402a-n denoting logical groupings of cache pages where each such logical grouping 402a-n includes cache pages containing data for a particular LUN having its data stored in the flash disk cache. Element 402a denotes a list of cached pages containing data in the Flash disk cache for LUN1. Element 402b denotes a list of cached pages containing data in the Flash disk cache for LUN2. Element 402n denotes a list of cached pages containing data in the Flash disk cache for LUN N.

Each of 402a-n may denote a structure linking together the cached pages of the Flash disk cache for a single LUN. Thus, for example, each entry such as 406a of 402a may denote a different cache page of the Flash disk cache 312 including cached data for LUN 1. In a similar manner, entries of each of LUN lists 402b-n also denote a different cache page of the Flash disk cache 312 including cached data for a particular LUN. Each of 402a-n may be any suitable data structure. For example, in one embodiment, each of 402a-n may be a doubly linked list data structure as known in the art. Additionally, each entry of a list, such as entry 406a, may denote a single cache page and may also include metadata regarding the cache page such as state information denoting whether the cached data of the cache page is dirty, the particular LBA or offset location(s) on the LUN corresponding to the data stored in the cache page, mapping information regarding the particular physical storage location in the flash disk cache where the cached data is stored (e.g., which PD and PD location in the flash disk cache contain the cached user data having a logical address of a LUN and LUN LBA), and the like, as described elsewhere herein. Entries in each of the LUN lists 402a-n may also ordered based on access frequency or temperature associated with the data cached in each cache page or list entry. For example, in one embodiment, entries of each list 402a-n may be ordered, from most recently used or accessed to least recently used (LRU) or accessed. For example with reference to 402a, entries in 402a may be ordered based on time since last accessed with the most recently used data at the top of the list and the least recently used data at the bottom of the list. To further illustrate, entry 406a may be the most recently used cached data for LUN 1 and entry 406b may be the least recently used cached data for LUN 1.

Additionally, information maintained for each entry of each list 402a-n may include an indicator as to whether the cached data page is dirty or clean. In at least one embodiment, the indication of whether each cached data page is dirty or clean may be reflected in an additional separate list, the dirty page list, maintained for each LUN.

At various points in time, data may be flushed or moved from the Fast disk cache to the back-end PDs 314 as noted above. For example, one or more cache pages of data (for which Flash data cache promotion is currently scheduled or can be performed since the cached data as sufficient access frequency) may be flushed from the Fast disk cache. Such flushing may occur, for example, when there are no free or clean pages available in the Flash disk cache. In such instances when there are no free or clean pages, processing may be performed that includes selecting one or more cache pages including data to be flushed from the Flash disk cache 312 to the PDs 314. In at least one embodiment, pages for a LUN may be selected for flushing (to reduce the total number of pages of the FAST cache including data for the LUN to be below or greater than a defined threshold level) in an order from least to most recently used. In this manner, the relative order of the LRU list, having blocks ranked from least recently used to most recently used, may serve as the order in which blocks stored in FAST cache pages are selected for eviction and flushing from the FAST cache (e.g., selected in sequential order for flushing from LRU to most recently used).

As noted elsewhere herein, data stored in the Flash disk cache may be dirty or WP in that the cached data is the most recent or up to date copy of the user data and is more up to date than the copy stored on the PDs (e.g., the data stored in the Flash disk cache has not yet been synchronized with the copy stored on the PDs 314). In such an instance, flushing may include flushing dirty cache pages including such dirty data to the PDs 314. Once the dirty data has been written from the Flash disk cache to the PDs (whereby the PDs 314 now include the same most recent copy of the data as stored in the Flash disk cache), the cache disk page and associated data may be updated in status from dirty to clean.

In connection with flushing, pages from different LUNs in a group for which FAST cache flushing is being performed may be removed in a round robin manner until the number of free cache pages in the FAST cache is at least the specified number of free pages.

In at least one embodiment in accordance with techniques herein, users may have flexibility to define and create a logical entity or grouping of LUNs referred to as a pool or storage pool. Each storage pool of LUNs may have a different data usage. However, in at least one existing implementation without use of techniques herein, all blocks of cached data in the FAST cache, and thus each pool, may have the same priority in connection with promotion and flushing. It may be desirable to provide a different FAST cache priority technique which is more flexible. In at least one embodiment in accordance with techniques herein, a new methodology may be used for FAST cache promotion and flushing in accordance with a policy. The policy may be characterized as a dynamic priority policy for use with the FAST cache that provides for per pool-based FAST cache priority. The foregoing in accordance with techniques herein provides users with an additional option to define pool level independent priority. In at least one embodiment in accordance with techniques herein, FAST cache priority may be specified at the pool level, such as for one or more selected pools, in combination with a default or other FAST cache priority technique used in instances for pools which do not have a separate pool level FAST cache priority in effect. In this manner, a user may use a combination of FAST cache priority techniques in an embodiment in accordance with techniques herein. A user may, for example, selectively specify per pool level FAST cache priority for one or more particular pools, and apply a default second FAST cache priority technique (e.g., such as discussed above in an existing implementation where remaining blocks of LUNs/pools all have the same priority in connection with promotion and flushing) for use with other remaining pools (for which no pool FAST cache priority is specified).

In an embodiment in accordance with techniques herein, each single storage pool may have an independent FAST cache priority from all other storage pools. Based on the particular priority specified for a pool, an independent block promotion reference count and LUN flushing threshold may be calculated and used in connection with, respectively, FAST cache promotion and flushing. Such data including the promotion reference count and flushing threshold for the pool may be loaded into memory as a priority map. As described below in more detail, promotion performed in an embodiment in accordance with techniques herein may include steps A1-A4 as discussed above with a new step A5" rather than step A5. The new step A5" that replaces step A5 is described below:

A5") Based on periodic scheduled times or other triggers causing FAST cache promotion processing, the shadow cache may be scanned to search for new data block candidates that may have become eligible for promotion to the FAST cache. In at least one embodiment in accordance with techniques herein, processing may include reading the independent (e.g. per pool) promotion reference count for each block from the priority map based on which pool includes the block. Processing then promotes blocks to FAST Cache having an associated reference hit count that is equal to or greater than the promotion reference count (e.g., minimum number of reference hits needed in order to be promoted to FAST cache). For each block promoted to the FAST cache, the FAST cache's memory map may be updated to record the particular FAST cache location storing a particular data block having a corresponding logical address (e.g., LUN and logical offset on the LUN). Additionally, for each promoted block, its recorded reference hit count may be removed from the shadow cache.

Figure 5:
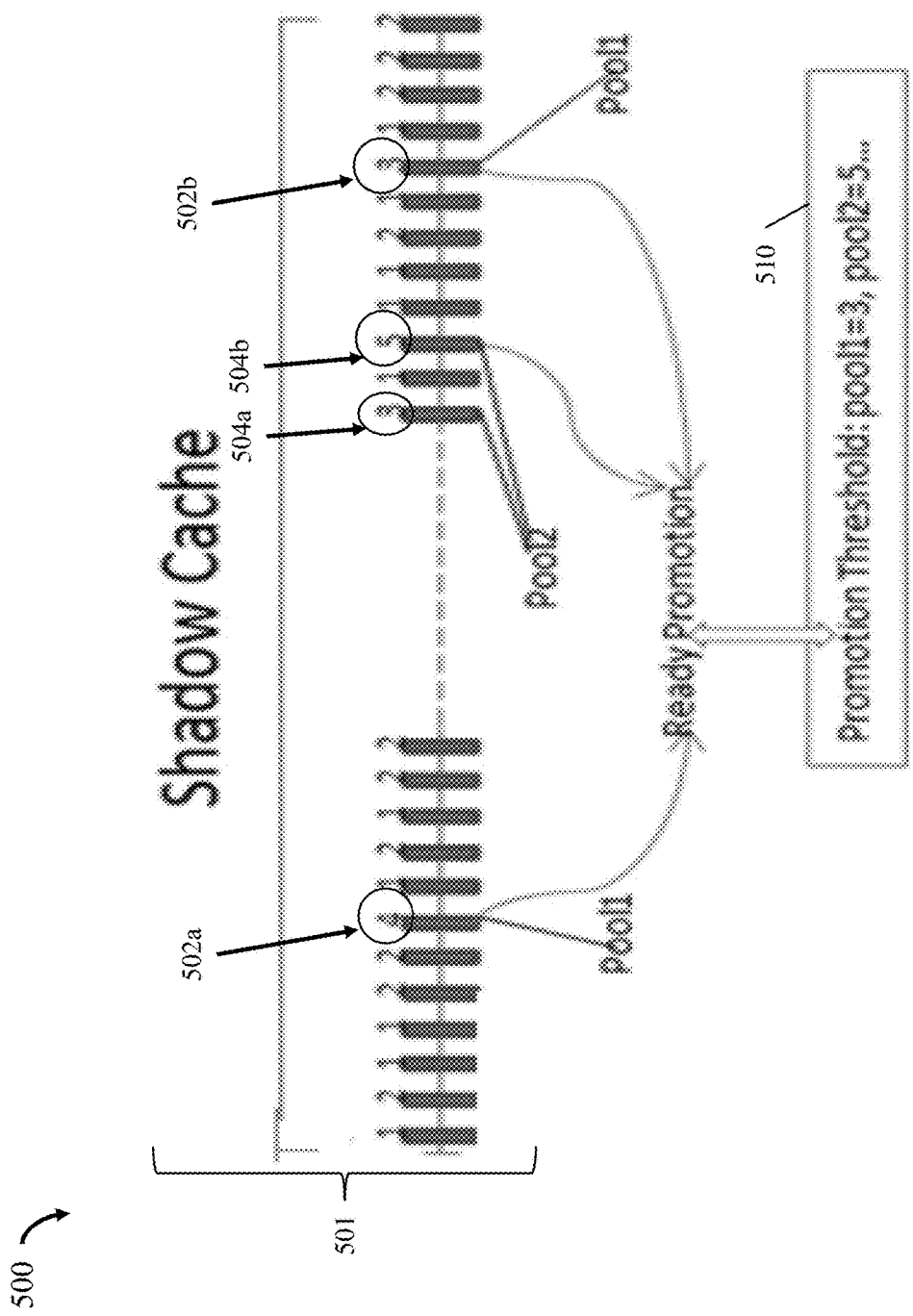
FIG. 5 is an example illustrating promotion in an embodiment in accordance with techniques herein.

Referring to FIG. 5, shown is an example 500 illustrating use of techniques herein in connection with FAST cache promotion. Element 501 may denote the reference hit counts for different blocks of different LUNs where the information of 501 may be included in the shadow cache at a point in time when the FAST cache promotion processing of steps A1-A4 and A5" (e.g., may be in specified sequential order) are performed as noted above. Element 510 denotes the pool-independent promotion thresholds for pool 1=3 and pool 2=5. Thus, based on 510, a block of a LUN from pool 1 needs to have a reference hit count of at least 3 to be promoted to the FAST cache; and a block of a LUN from pool 2 needs to have a reference hit count of at least 5 to be promoted to the FAST cache.

To further illustrate, element 502a denotes a reference hit count of 4 as recorded in the shadow cache for a first block from a LUN included in pool 1. The first block has a reference hit count=4 which exceeds the pool 1 promotion threshold of 3 whereby the first block may be promoted to the FAST cache from the PDs. Element 502b denotes a reference hit count of 3 as recorded in the shadow cache for a second block from a LUN included in pool 1. The second block has a reference hit count=3 which exceeds the pool 1 promotion threshold of 3 whereby the second block may be promoted to the FAST cache from the PDs. Element 504a denotes a reference hit count of 3 as recorded in the shadow cache for a third block from a LUN included in pool 2. The third block has a reference hit count=3 which does not exceed the pool 2 promotion threshold of 5 whereby the third block is not promoted to the FAST cache from the PDs. Element 504b denotes a reference hit count of 5 as recorded in the shadow cache for a fourth block from a LUN included in pool 2. The fourth block has a reference hit count=5 which does equal the pool 2 promotion threshold of 5 whereby the fourth block may be promoted to the FAST cache from the PDs.

As described below in more detail, flushing performed in an embodiment in accordance with techniques herein may include steps B1 and B4 as discussed above with new steps B2" and B3" rather than step B2 and B3. The new steps B2" and B3" that replace, respectively, steps B2 and B3 are described below:

B2") When the number of free pages or entries available in the FAST cache is equal to or less than the specified number of minimum free pages, the flush engine processing may be triggered to flush data from the FAST cache to the PDs of 314. Flushing processing may include the flush engine obtaining the per pool independent Flushing Threshold for each LUN from the priority map based on which pool each LUN belongs to. Thus, a different flushing threshold may be specified for each pool where the pool's flushing threshold is applied per LUN included in the pool. The flushing threshold denotes a threshold number of pages of the FAST cache that may be used for storing the LUN's data whereby if the total number of FAST cache pages currently in use for storing the LUN's data exceeds the flushing threshold, pages of the LUN's data may be flushed from the FAST cache until the total number of FAST cache pages currently in use for storing the LUN's data falls below the flushing threshold. In step B2", scanning is performed with respect to a group (e.g., <=8) LUNs whose total number of used/allocated pages of the FAST cache have exceeded the flushing threshold for the LUN.

B3") Flush engine flushes cached data from FAST cache pages to the PDs until each of the LUNs of the current group have a total number of pages in the FAST cache below the LUN's own flushing threshold. In connection with flushing, pages from different LUNs in a group for which FAST cache flushing is being performed may be removed in a round robin manner until the number of free cache pages in the FAST cache is at least the specified number of free pages.

Figure 6:
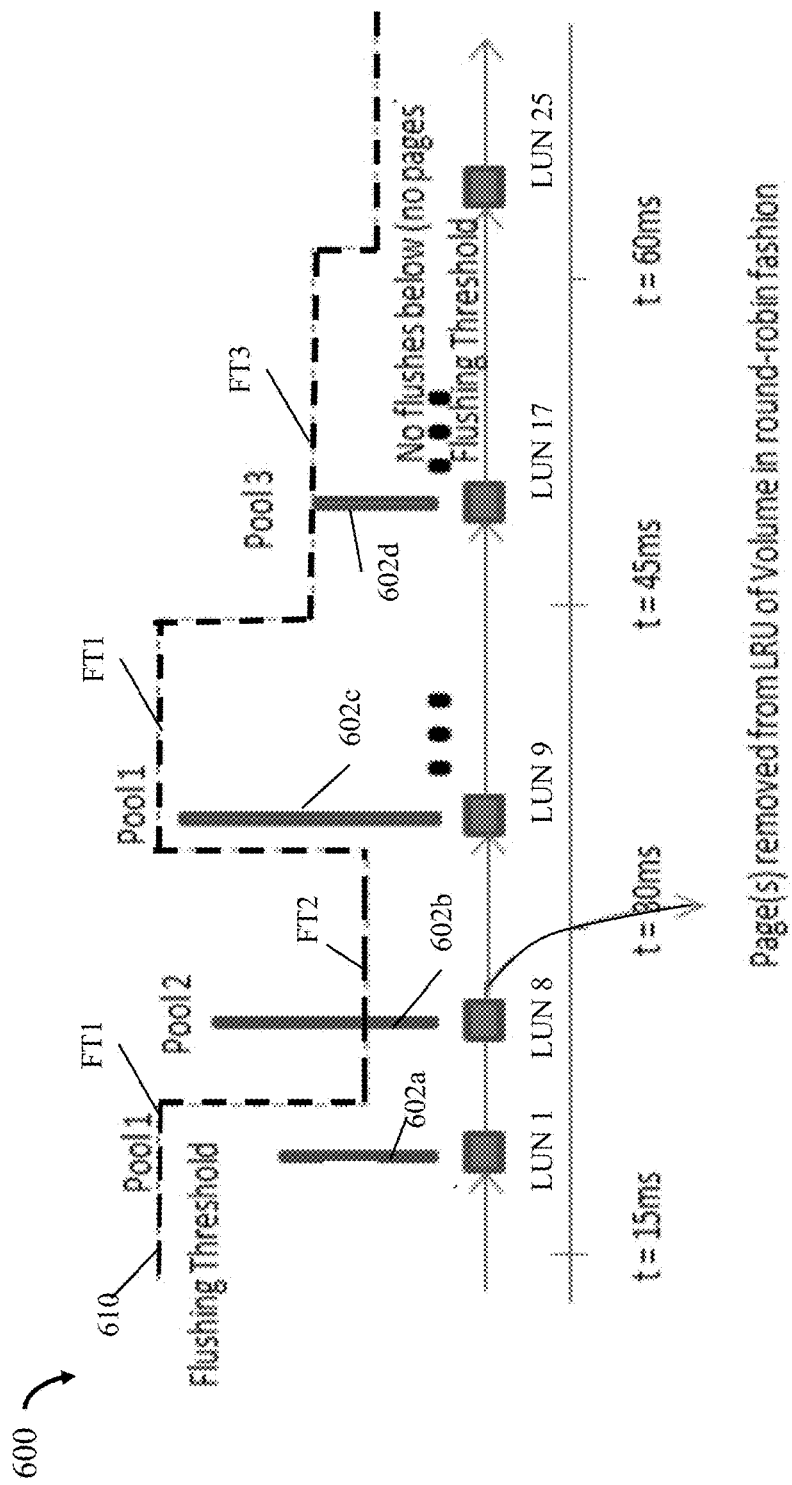
FIG. 6 is an example illustrating flushing in an embodiment in accordance with techniques herein.

Referring to FIG. 6, shown is an example 600 illustrating use of techniques herein with pool level flushing thresholds in an embodiment. The example 600 illustrates in the form of a bar graph the number of cache pages of the FAST cache currently allocated or in use storing data of different LUNs at a point in time. For example, element 602a denotes the number of cache pages containing blocks from LUN 1; element 602b denotes the number of cache pages containing blocks from LUN 8; element 602c denotes the number of cache pages containing blocks from LUN 9; and element 602d denotes the number of cache pages containing blocks from LUN 17. The dashed line 610 illustrates the different flushing thresholds specified for different pools. In this example, LUNs 1 and 9 may be in pool 1 and thus have the same flushing threshold FT1 applied. LUN 8 is in pool 2 and may have different flushing threshold FT2 applied. LUN 17 is in pool 3 and may have yet a different flushing threshold FT3 applied. In this example, the relative comparisons between the foregoing 3 flushing thresholds illustrated are FT2<FT3<FT1. Each of the 3 flushing thresholds are different and applied for use in connection with LUNs for 3 different pools. The number of FAST cache pages storing LUN 1 data (denoted by 602a) is below FT1 (as illustrated by a portion of dashed line 610 over 602a) whereby no blocks of cached pages storing LUN 1 data are flushed from the FAST cache. The number of FAST cache pages storing LUN 2 data (denoted by 602b) is above FT2 (as illustrated by a portion of dashed line 610 over 602b) whereby blocks of cached pages storing LUN 1 data are flushed from the FAST cache so that, for example, the level denoted by 602b falls below FT2. The number of FAST cache pages storing LUN 9 data (denoted by 602c) is below FT1 (as illustrated by a portion of dashed line 610 over 602c) whereby no blocks of cached pages storing LUN 9 data are flushed from the FAST cache. The number of FAST cache pages storing LUN 17 data (denoted by 602d) is equal FT3 (as illustrated by a portion of dashed line 610 over 602d) whereby no blocks of cached pages storing LUN 17 data are flushed from the FAST cache.

Referring to FIG. 7, shown is an example 700 of a data structure that may be used in an embodiment in accordance with techniques herein. The data structure 700 may be used to record the pool priority such as may be specified by a user, and the threshold values for the pool used in connection with promotion and flushing (e.g., promotion threshold, $T_{promotion}$, and flushing threshold, $T_{flushing}$). There may be one instance of the data structure 700 for each pool for which pool level priority and thresholds are specified. The data structure 700 includes the following fields:

Pool ID 704 denoting the identifier or ID uniquely identifying the pool

Pool Priority 708 denoting the FAST Cache pool priority as may be set by the user. In at least one embodiment, the pool priority may be an integer in the inclusive range from 0 to 2. In such an embodiment, 0 may denote the highest priority and 2 may denote the lowest priority. A priority having a special defined value, such as 0XFFFF, may denote that the FAST Cache use is disabled for this pool is disabled. The pool priority 708 may be maintained by the Pool Priority Management module 804 illustrated in FIG. 8 described below.

$T_{promotion}$ 702 denotes the promotion threshold specifying the minimum number of read hits for a block of this pool to be promoted from PDs to the FAST Cache. The value 702 may be maintained by Threshold Calculator module 806 illustrated in FIG. 8 described below.

$T_{flushing}$ 706 denotes the flushing threshold specifying a threshold number of cache pages of the FAST cache that may be allocated or used for storing data of a LUN belonging to this pool. If the current number of FAST cache pages storing the LUN's data exceeds the flushing threshold $T_{flushing}$, data for the LUN may be flushed from the FAST cache until the current number falls below the flushing threshold $T_{flushing}$. The value 706 may be maintained by the Threshold Calculator module 806 of FIG. 8 described below.

Figure 8:
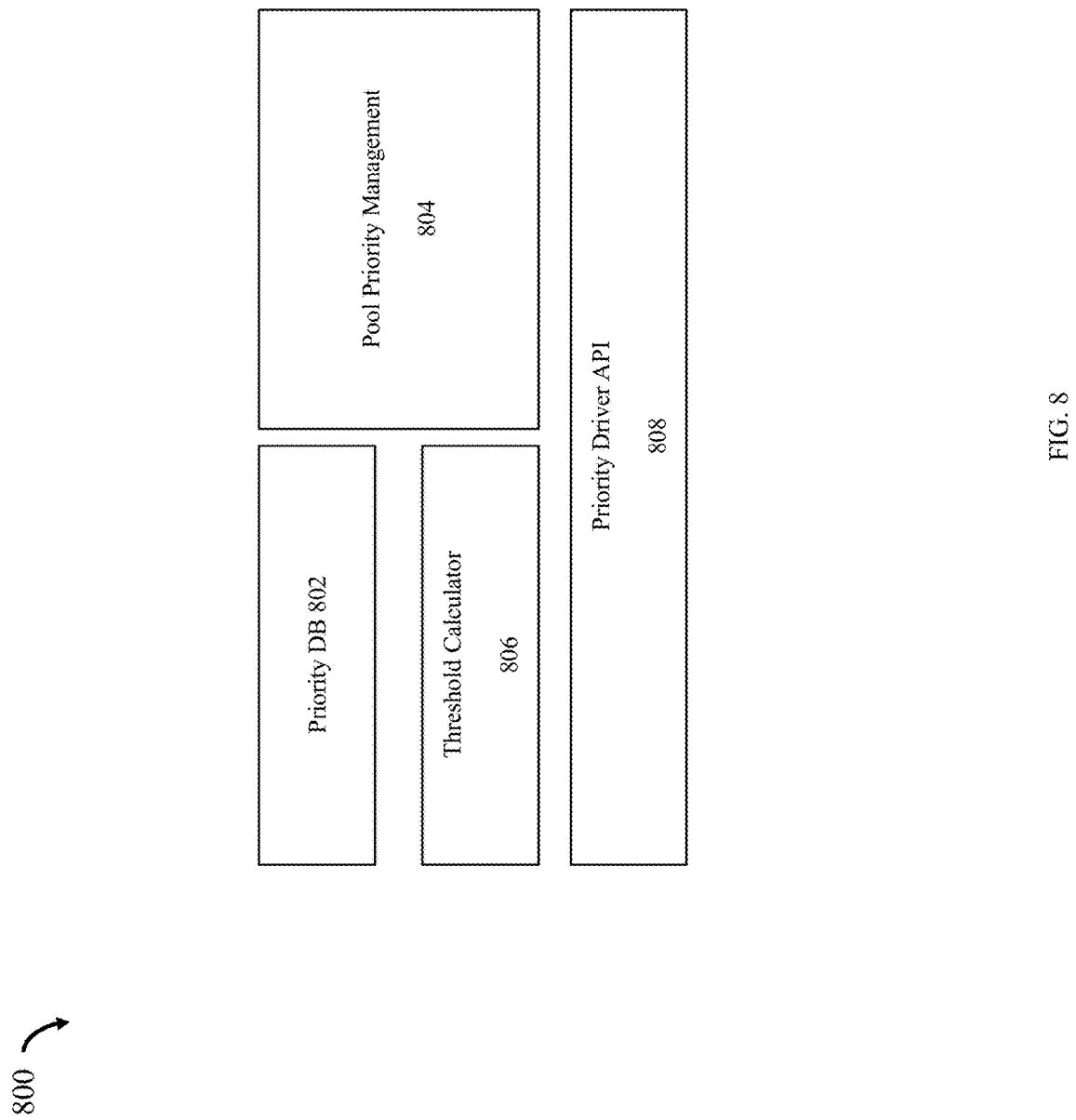
FIG. 8 is an example of different modules that may be used in an embodiment in accordance with techniques herein.

Referring to FIG. 8, shown is an example 800 of different modules that may be used in an embodiment in accordance with techniques herein.

Element 808 denotes the Priority Driver API (application programming interface). This module 808 provides the API to a FAST Cache driver that may be used to obtain information from one of the data structures of FIG. 7. For example, the FAST Cache layer may obtain the pool priority 708 or one of the thresholds 702, 706 for the pool using the API 808.

Element 804 denotes the Pool Priority Management module that manages the priority information of pools and also provides the interface to the priority driver API 808 to modify the priority settings (e.g., modify values of 708 for different pools). When FAST Cache is enabled or the user changes a priority for a pool module 804 provides the new updated set of information including a revised set of values in the affected pool data structure 700 as included in the priority memory map for the pool Element 806 denotes the Threshold Calculator module that calculates the thresholds for promotion and flushing (e.g., calculates the values 702 and 706) used with the FAST cache.

Element 802 denotes the Priority DB (databased) module that stores the priority data (e.g., at least the values for 708 for the different pools 704) in the system. Element 802 may also perform processing, such as to perform backup and restoration of the priority data specified for pools.

Below are equations that may be used in an embodiment in accordance with techniques herein to calculate the promotion threshold $T_{promotion}$ and flushing threshold $T_{flushing}$ in an embodiment in accordance with techniques herein.

$$T_{promotion} = \text{Alpha} * P_{pool} + T_{pmin} \qquad \text{EQUATION 1}$$

where

Alpha is a constant denoting regulatory factor used to expand the span of pool priority values. In at least one embodiment Alpha may be an integer value that is equal to or greater than 1;

$T_{promotion}$ is the promotion threshold of the pool (e.g., value 702);

$P_{pool}$ is the priority of pool; and $T_{pmin}$ is the minimum promotion threshold that may be specified for any pool in the system.

$$T_{flushing} = T_{FMAX} - \text{Beta} * P_{pool} \qquad \text{EQUATION 2}$$

where $T_{flushing}$ is the flushing threshold of the pool (e.g., value 706);

$P_{pool}$ is the priority of pool;

Beta is a constant denoting regulatory factor used to expand the span of pool priority values; and $T_{FMAX}$ is the maximum flushing threshold of the system and denotes a maximum number of pages or blocks of a LUN that may be stored in the FAST cache.

In at least one embodiment, the quantity/product of $\text{Beta} * P_{pool}$ is less than $T_{FMAX}$, which means that $T_{flushing}$ is more than 0.

What will now be described are various flowcharts of processing steps that may be performed in an embodiment in accordance with techniques herein. Such flowcharts generally summarize processing steps as described above.

Figure 9:
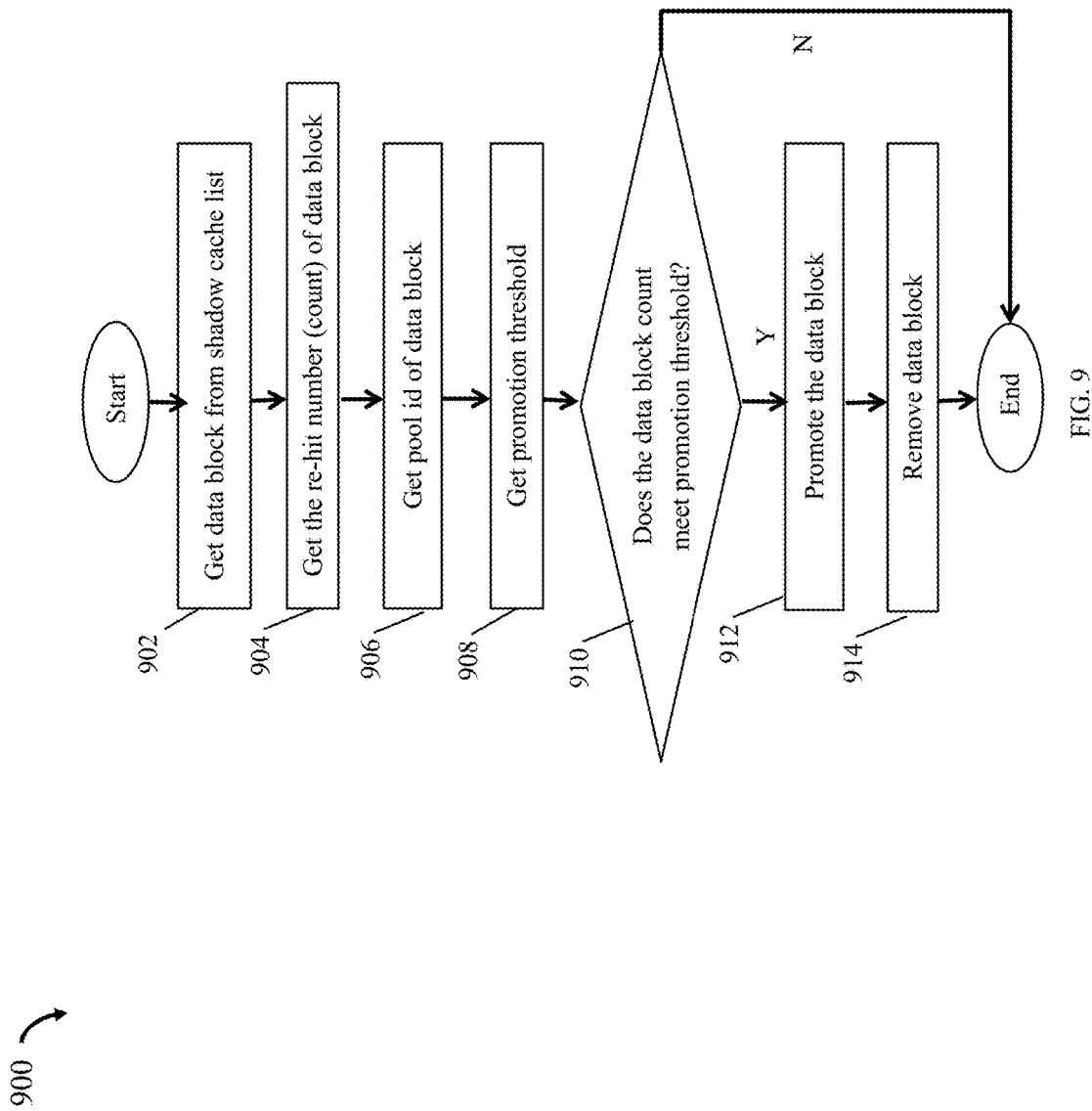
FIGS. 9, 10 and 11 are flowcharts of processing steps that may be performed in an embodiment in accordance with techniques herein.

Referring to FIG. 9, shown is a flowchart 900 of processing steps that may be performed in connection with FAST cache promotion processing in an embodiment in accordance with techniques herein. At step 902, a data block having an associated logical address (e.g., LUN and LBA) may be selected where the data block has recorded information stored in the shadow cache. At step 904, information from the shadow cache for the data block may be obtained where the information includes the rehit or count denoting the number of I/O hits/references observed for the data block (e.g., count of the number of I/Os directed to the data block's logical address of LUN, LBA. At step 906 the pool ID of the data block may be obtained. At step 908, the promotion threshold for the data block may be obtained. The promotion threshold is obtained from the priority memory map for the particular pool ID to which the data block belongs. At step 910, a determination is made as to whether the count for the data block is equal to or greater than the promotion threshold. If step 910 evaluates to no, processing stops. If step 910 evaluates to yes, control proceeds to step 912 where the data block is promoted to the FAST cache. At step 912, information regarding the data block is removed from the shadow cache after the FAST cache promotion of the data block has been performed.

Figure 10:
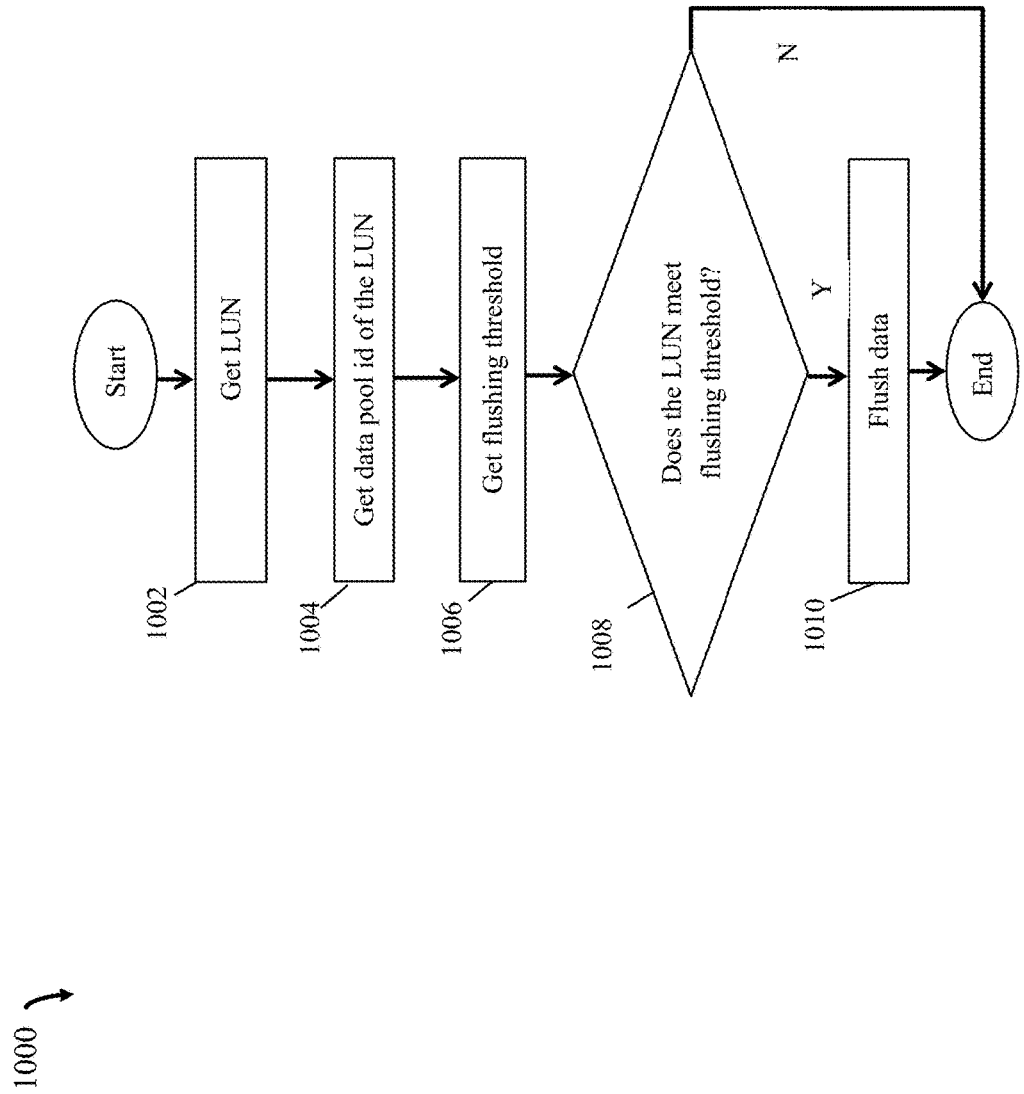

Referring to FIG. 10, shown is a flowchart 1000 of processing steps that may be performed in connection with FAST cache flushing processing in an embodiment in accordance with techniques herein. At step 1002, a LUN having its data stored in the FAST cache may be determined. At step 1004, the pool ID for the LUN is obtained (e.g., pool ID denotes the pool including the LUN). At step 1006, the flushing threshold for the LUN may be obtained from the memory map. The flushing threshold is obtained for the particular pool denoted by the pool ID for the LUN. At step 1008, a determination is made as to whether the LUN meets the flushing threshold. Step 1008 may include determining whether the current number of pages of the FAST cache including data for the LUN exceeds the flushing threshold.

If step 1008 evaluates to no, processing stops for the current LUN. If step 1008 evaluates to yes, control proceeds to step 1010 to flush data for the LUN from the FAST cache. In at least one embodiment as described herein, data for the LUN may be flushed from FAST cache, for example, until the current number of cache pages of the FAST cache including the LUN's data falls below the flushing threshold. Processing for the LUN stops after step 1010.

Figure 11:
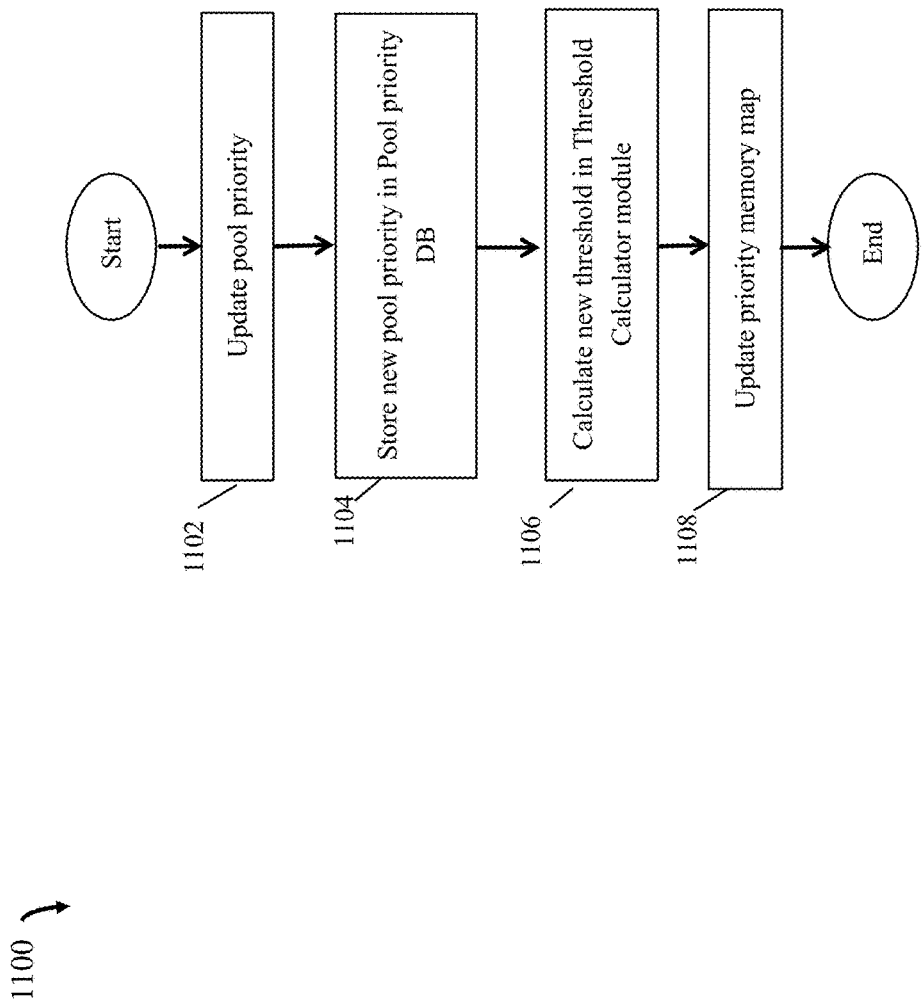

Referring to FIG. 11, shown is a flowchart 1000 of processing steps that may be performed in connection with updating information maintained for a pool responsive to a change or update in pool priority in an embodiment in accordance with techniques herein. At step 1102, a change or update is made to the pool priority. Step 1102 may be performed, for example, using a user interface to obtain the updated pool priority specified by a user. At step 1104, processing is performed to store the new pool priority in the pool priority DB to persistently store the new pool priority on non-volatile physical storage. At step 1106, processing is performed to calculate revised or updated threshold values for the pool including the promotion threshold (e.g., using EQUATION 1) and the flushing threshold (e.g., using EQUATION 2). At step 1108, the priority memory map, or more generally copy of the information of the data structure of FIG. 7 for this affected pool as stored in memory, may be updated.

The foregoing describes features that may be used in an embodiment in accordance with techniques herein in connection with a caching layer, such as an L2 caching layer (e.g., 312 of FIG. 3) of physical storage devices. In at least one embodiment, the caching layer may include one or more flash PD devices. However, more generally, the caching layer in accordance with techniques herein may include other forms of fast memory where such memory may a form of non-volatile storage or also a form of volatile storage (e.g., such as form of solid state storage which is volatile). For example, techniques herein may also be used in connection with phase-change memory (PCM) devices, rather than flash PD devices, used for the L2 caching layer (e.g., element 312 of FIG. 3). PCM is also known in the art as PCME, PRAM, PCRAM, Ovonic Unified Memory, Chalcogenide RAM and C-RAM and is a type of non-volatile random-access memory.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of caching data comprising:
performing promotion processing to promote one or more data portions to a secondary cache, wherein said secondary cache and a primary data cache are included in a plurality of caching layers, said promotion processing using a first promotion threshold specified for a first pool of logical devices to determine whether a first data portion of the first pool of logical devices is promoted to the secondary cache, said promotion processing using a second promotion threshold specified for a second pool of logical devices to determine whether a second data portion of the second pool of logical devices is promoted to the secondary cache;
determining whether a current number of free cache pages in the secondary cache is greater than a specified minimum number of secondary cache pages; and
responsive to determining the current number of free cache pages in the secondary cache is not greater than the specified minimum number of free pages, performing flushing processing to flush one or more data portions from the secondary cache to physical storage, said flushing processing using a first flushing threshold specified for the first pool of logical devices to determine whether a third data portion of the first pool of logical devices is flushed from the secondary cache, wherein the first flushing threshold denotes a maximum number of secondary cache pages used for storing data of each logical device of the first pool and the flushing processing applies the first flushing threshold individually to each logical device of the first pool, said flushing processing using a second flushing threshold specified for the second pool of logical devices to determine whether a fourth data portion of the second pool of logical devices is flushed from the secondary cache, wherein the second flushing threshold denotes a maximum number of secondary cache pages used for storing data of each logical device of the second pool and the flushing processing applies the second flushing threshold individually to each logical device of the second pool.

2. The method of claim 1, wherein the promotion processing includes:
determining whether a first count, denoting a number of I/Os referencing the first data portion, is equal to or greater than the first promotion threshold; and
responsive to determining the first count is equal to or greater than the first promotion threshold, promoting the first data portion to the secondary cache.

3. The method of claim 2, wherein the promotion processing includes:
determining whether a second count, denoting a number of I/Os referencing the second data portion, is equal to or greater than the second promotion threshold; and
responsive to determining the second count is equal to or greater than the second promotion threshold, promoting the second data portion to the secondary cache.

4. The method of claim 1, wherein the third data portion is stored at a first logical address of a first logical device, said first logical device being included in the first pool, and wherein the flushing processing includes:
determining whether a third count, denoting a number of cache pages of the secondary cache include cached data of the first logical device, exceeds the first flushing threshold; and
responsive to determining the third count exceeds the first flushing threshold, flushing the third data portion from the secondary cache to physical storage.

5. The method of claim 4, wherein data portions of the first logical device are flushed from the secondary cache to physical storage until the third count is below the first flushing threshold.

6. The method of claim 5, wherein the fourth data portion is stored at a second logical address of a second logical device, said second logical device being included in the second pool, and wherein the flushing processing includes:

determining whether a fourth count, denoting a number of cache pages of the secondary cache include cached data of the second logical device, exceeds the second flushing threshold; and responsive to determining the fourth count exceeds the second flushing threshold, flushing the fourth data portion from the secondary cache to physical storage.

7. The method of claim 6, wherein data portions of the second logical device are flushed from the secondary cache to physical storage until the fourth count is below the second flushing threshold.

8. The method of claim 1, further comprising:

receiving a first set of values for the first pool, said first set of values including a first priority for the first pool, the first flushing threshold for the first pool and the first promotion threshold for the first pool; and receiving a second set of values for the second pool, said second set of values including a second priority for the second pool, the second flushing threshold for the second pool and the second promotion threshold for the second pool.

9. The method of claim 8, wherein the first flushing threshold and the first promotion threshold are calculated using the first priority.

10. The method of claim 9, wherein the second flushing threshold and the second promotion threshold are calculated using the second priority.

11. The method of claim 8, wherein said first pool includes a first plurality of logical devices and the second pool includes a second plurality of logical devices, wherein the first set of values are used in connection with performing promotion and flushing of the secondary cache with respect to data portions of the first plurality of logical devices, and wherein the second set of values are used in connection with performing promotion and flushing of the secondary cache with respect to data portions of the second plurality of logical devices.

12. The method of claim 1, wherein the flushing processing is performed responsive to determining that a current number of free pages in the secondary cache is below a specified minimum threshold.

13. The method of claim 1, wherein the secondary cache includes a plurality of flash-based storage devices.

14. The method of claim 1, wherein the plurality of caching layers are included in a data storage system.

15. A system comprising:

one or more processors; and a memory comprising code stored therein that, when executed by at least one of the processors, performs a method of caching data comprising:

performing promotion processing to promote one or more data portions to a secondary cache, wherein said secondary cache and a primary data cache are included in a plurality of caching layers, said promotion processing using a first promotion threshold specified for a first pool of logical devices to determine whether a first data portion of the first pool of logical devices is promoted to the secondary cache, said promotion processing using a second promotion threshold specified for a second pool of logical devices to determine whether a second data portion of the second pool of logical devices is promoted to the secondary cache;

determining whether a current number of free cache pages in the secondary cache is greater than a specified minimum number of secondary cache pages; and responsive to determining the current number of free cache pages in the secondary cache is not greater than the specified minimum number of free pages, performing flushing processing to flush one or more data portions from the secondary cache to physical storage, said flushing processing using a first flushing threshold specified for the first pool of logical devices to determine whether a third data portion of the first pool of logical devices is flushed from the secondary cache, wherein the first flushing threshold denotes a maximum number of secondary cache pages used for storing data of each logical device of the first pool and the flushing processing applies the first flushing threshold individually to each logical device of the first pool, said flushing processing using a second flushing threshold specified for the second pool of logical devices to determine whether a fourth data portion of the second pool of logical devices is flushed from the secondary cache, wherein the second flushing threshold denotes a maximum number of secondary cache pages used for storing data of each logical device of the second pool and the flushing processing applies the second flushing threshold individually to each logical device of the second pool.

16. A non-transitory computer readable medium comprising code stored thereon that, when executed, performs a method of caching data comprising:

performing promotion processing to promote one or more data portions to a secondary cache, wherein said secondary cache and a primary data cache are included in a plurality of caching layers, said promotion processing using a first promotion threshold specified for a first pool of logical devices to determine whether a first data portion of the first pool of logical devices is promoted to the secondary cache, said promotion processing using a second promotion threshold specified for a second pool of logical devices to determine whether a second data portion of the second pool of logical devices is promoted to the secondary cache;

determining whether a current number of free cache pages in the secondary cache is greater than a specified minimum number of secondary cache pages; and responsive to determining the current number of free cache pages in the secondary cache is not greater than the specified minimum number of free pages, performing flushing processing to flush one or more data portions from the secondary cache to physical storage, said flushing processing using a first flushing threshold specified for the first pool of logical devices to determine whether a third data portion of the first pool of logical devices is flushed from the secondary cache, wherein the first flushing threshold denotes a maximum number of secondary cache pages used for storing data of each logical device of the first pool and the flushing processing applies the first flushing threshold individually to each logical device of the first pool, said flushing processing using a second flushing threshold specified for the second pool of logical devices to determine whether a fourth data portion of the second pool of logical devices is flushed from the secondary cache, wherein the second flushing threshold denotes a maximum number of secondary cache pages used for storing data of each logical device of the second pool and the flushing processing applies the second flushing threshold individually to each logical device of the second pool.

17. The non-transitory computer readable medium of claim 16, wherein the promotion processing includes:
- determining whether a first count, denoting a number of I/Os referencing the first data portion, is equal to or greater than the first promotion threshold;
- responsive to determining the first count is equal to or greater than the first promotion threshold, promoting the first data portion to the secondary cache;
- determining whether a second count, denoting a number of I/Os referencing the second data portion, is equal to or greater than the second promotion threshold; and
- responsive to determining the second count is equal to or greater than the second promotion threshold, promoting the second data portion to the secondary cache.

18. The non-transitory computer readable medium of claim 16, wherein the third data portion is stored at a first logical address of a first logical device, said first logical device being included in the first pool, and wherein the flushing processing includes:
- determining whether a third count, denoting a number of cache pages of the secondary cache include cached data of the first logical device, exceeds the first flushing threshold; and
- responsive to determining the third count exceeds the first flushing threshold, flushing the third data portion from the secondary cache to physical storage.

19. The non-transitory computer readable medium of claim 18, wherein data portions of the first logical device are flushed from the secondary cache to physical storage until the third count is below the first flushing threshold.

20. The non-transitory computer readable medium of claim 19, wherein the fourth data portion is stored at a second logical address of a second logical device, said second logical device being included in the second pool, and wherein the flushing processing includes:
- determining whether a fourth count, denoting a number of cache pages of the secondary cache include cached data of the second logical device, exceeds the second flushing threshold; and
- responsive to determining the fourth count exceeds the second flushing threshold, flushing the fourth data portion from the secondary cache to physical storage.

21. The non-transitory computer readable medium of claim 18, wherein data portions of the second logical device are flushed from the secondary cache to physical storage until the fourth count is below the second flushing threshold.

22. The non-transitory computer readable medium of claim 16, wherein a first set of values are specified for the first pool, said first set of values including a first priority for the first pool, the first flushing threshold for the first pool and the first promotion threshold for the first pool, the first flushing threshold and the first promotion threshold being determined in accordance with the first priority; and wherein a second set of values are specified for the second pool, said second set of values including a second priority for the second pool, the second flushing threshold for the second pool and the second promotion threshold for the second pool, the second flushing threshold and the second promotion threshold being determined in accordance with the second priority.

* * * * *